(12) United States Patent
Boswell et al.

(10) Patent No.: US 6,992,654 B2
(45) Date of Patent: Jan. 31, 2006

(54) SYSTEM AND METHOD FOR PROVIDING USER INPUT TO CHARACTER ANIMATION

(75) Inventors: Colin Boswell, Millbrae, CA (US); William Alexander Karweit, San Francisco, CA (US); Mike Ryan Olsen, San Mateo, CA (US); Todd William Growney, San Francisco, CA (US)

(73) Assignee: Electronic Arts Inc., Redwood City, CA (US)

( * ) Notice: Subject to any disclaimer, the term of this patent is extended or adjusted under 35 U.S.C. 154(b) by 140 days.

(21) Appl. No.: 10/227,184

(22) Filed: Aug. 21, 2002

(65) Prior Publication Data

US 2004/0036673 A1 Feb. 26, 2004

(51) Int. Cl.
*G09G 5/00* (2006.01)
*G09G 5/08* (2006.01)

(52) U.S. Cl. .................. 345/161; 345/156; 345/162

(58) Field of Classification Search ........ 345/156–167, 345/866, 501, 530–531, 520–522, 418–421, 345/440, 473–475; 600/586
See application file for complete search history.

(56) References Cited

U.S. PATENT DOCUMENTS 6,208,360 B1 * 3/2001 Doi et al. .................. 345/474
6,535,215 B1 * 3/2003 DeWitt et al. .............. 345/473
2004/0054302 A1 * 3/2004 Czernicki ................... 600/586
2004/0135788 A1 * 7/2004 Davidson et al. ........... 345/530

FOREIGN PATENT DOCUMENTS

JP 2000-293142 * 10/2000

* cited by examiner

*Primary Examiner*—Vijay Shankar
(74) *Attorney, Agent, or Firm*—Townsend and Townsend and Crew LLP

(57) ABSTRACT

The present invention provides a system that increases a user's control over character animation. Time-dependent signals are accepted from a user input device. The input is processed in real-time such that the user's input can be used to directly control the animation of an animated character. For example, the animation of a three-dimensional rendered character swinging a golf club in a golf game can be changed in mid-swing according to the user's operation of an input device. In general the system accepts user continuous and real-time user input. The user is given improved control and visual feedback on the movement being animated. One embodiment of the invention includes an analog input module, a control state machine module and an animation state machine module. The analog input module is configured to receive user analog input (e.g., from an analog joystick) related to animated character display and to normalize the user analog input to create a normalized user analog input.

8 Claims, 2 Drawing Sheets

SYSTEM AND METHOD FOR PROVIDING USER INPUT TO CHARACTER ANIMATION

BACKGROUND OF THE INVENTION

The present invention relates, in general, to animation systems and, in particular, to systems and methods for providing user input to character animation.

It is common for conventional animation systems, such as those employed in modern video game console systems, to include devices for accepting user input related to character animation. FIG. 1 is a simplified block diagram of a conventional system 100 for providing user input for character animation. Conventional animation system 100 includes a user input module 110 for accepting user input, a central processor unit (CPU) 120 for processing the user input using algorithms and a display module 130 (e.g., a video display with three-dimensional graphics) for displaying an animated character. Typically, user input is accepted at user input module 110 from either a digital joy pad that provides an "on state" or an "off state" in multiple directions, or from an analog joystick that provides scalar values in two axes.

One drawback of conventional animation systems is that user input is limited. When limited user input is applied to an animated character, the result can be animated character movement that is too loosely controlled by the user to result in satisfying and accurate game play. For instance, if a user is providing input to an animated golfer swinging a golf club, the user would typically be expected to press a button one or more times in a given time period, t, to represent the power of the animated character's golf shot. The time period t is then input to a predetermined function, fn(t), that controls the visual feedback to the user provided by the display module (e.g., a swing animation representing a swing of the golf club at a specific shot power). With this approach, the user may not receive any visual display feedback until well after the user's input has been provided. Some conventional animation systems always display a single animation and the function fn(t) may be used to modify an aspect of the animation other than the animated golfer, such as the flight of a golf ball struck by the animated golfer.

Additional drawbacks of conventional animation systems are that the feedback loop, from user input to visual display, is discontinuous and therefore not real-time. For example, the user may have to select or specify parameters of a movement before the movement begins. The movement, or animation cannot be modified once it has begun. This is not lifelike since actually human body movements can be modified at any time. Also, often the user is only allowed to provide a binary input, as from a switch, to specify a continuous movement in an analog feedback loop.

SUMMARY OF THE INVENTION

The present invention provides a system that increases a user's control over character animation. Time-dependent signals are accepted from a user input device. The input is processed in real-time such that the user's input can be used to directly control the animation of an animated character. For example, the animation of a three-dimensional rendered character swinging a golf club in a golf game can be changed in mid-swing according to the user's operation of an input device. In general the system accepts user continuous and real-time user input. The user is given improved control and visual feedback on the movement being animated.

One embodiment of the invention includes an analog input module, a control state machine module and an animation state machine module. The analog input module is configured to receive user analog input (e.g., from an analog joystick) related to animated character display and to normalize the user analog input to create a normalized user analog input.

The control state machine module is configured to receive the normalized user analog input from the analog input module and to create a time-based state based thereon. The time-based state created by the control state machine module models an intent of the user with respect to the animated character. For instance, pulling back on the analog stick may be modeled to pulling back on a golf club.

The animation state machine module is configured to receive the time-based state from the control state machine module and to create a list of animations and a blending percentage for combining the list of animations. The list of animations and blending percentage are based on the time-based state. The animation state machine is also configured to provide the list of animations and blending percentage to the animation display system.

One embodiment of the invention provides a method for controlling a computer animation of human movement. The method uses a user input device coupled to a computer system. The method includes receiving a signal from the user interface device that changes over time; and using the received signal to control a computer animation of human movement generated by the computer system.

DESCRIPTION OF EXEMPLARY EMBODIMENT OF THE INVENTION

Figure 1:
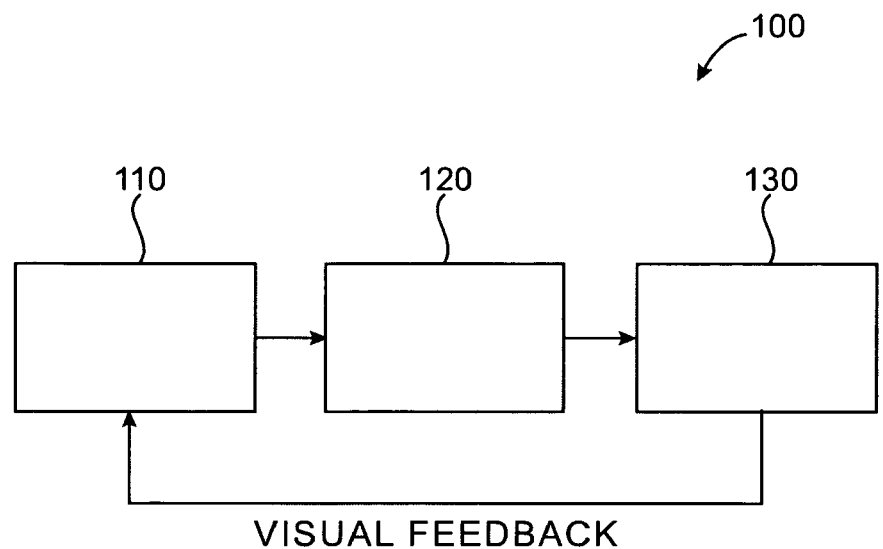
FIG. 1 is a simplified block diagram of a prior art animation system.
Figure 2:
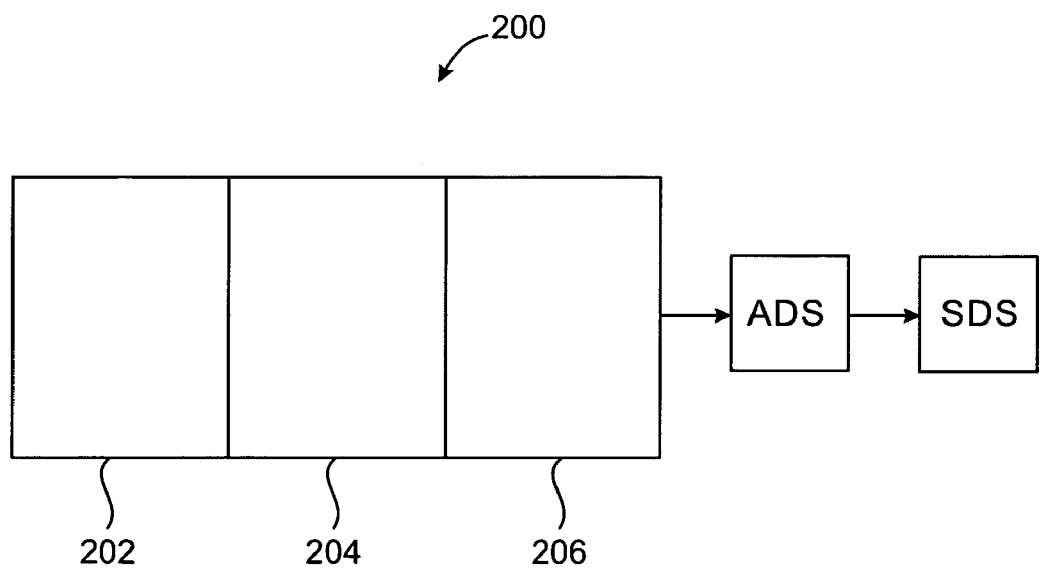
FIG. 2 is a simplified block diagram of a system according to one embodiment of the present invention operatively coupled to an animation display system.

FIG. 2 is a simplified block diagram of a system 200 for providing user input for animated character display according to one embodiment of the present invention. In FIG. 2, system 200 illustrated as operatively coupled to an Animation Display System (ADS) configured to receive skeletal animation data and a Skeletal Display System (SDS) configured to receive skeletal vertex mapping data from the ADS. It should be apparent that FIG. 2 is a high-level system description of a preferred embodiment and that many other approaches to character animation and control can be used.

In general, any suitable system providing user interface, control, animation and display functions, or portions thereof, can be suitable for use with the present invention. Examples of such systems include general purpose computers such as personal computers, workstations, etc.; game consoles, handheld computing devices, arcade games, simulators, etc. Such systems can be standalone or networked. Various hardware architectures such as multiprocessing, distributed processing, dedicated logic, etc., can be used. Various software approaches can be employed including compiled or interpreted code, firmware, microcode, etc. Functions of the invention can be performed in hardware or software, as desired.

For ease of illustration, aspects of the present invention are described with respect to an animated golfer. However, it should be apparent that the present invention can be used to provide user input for the display of any animated character, including two-dimensional and three-dimensional animated characters such as in sports or athletic events. Other applications are possible as where a system is used to study anatomy, physical kinematics, to develop models or animation sequences, for simulation purposes, etc.

System 200 includes analog input module 202, control state machine module 204 and animation state machine module (206). Analog input module 202 is configured to receive user analog input. As used in the present application, "analog input" refers to time-based or time-changing signals that are more continuous than discrete. For example, an analog joystick might use potentiometers to output a voltage level that is converted to a digital number via an analog-to-digital converter. Thus, the x-y position of the joystick is represented by numbers that can change continuously in real time. This is distinguished from an instantaneous type of input, such as a switch or button, that merely indicates one of two states. Other types of analog inputs can be pressure sensitive (e.g., a resistive or capacitive load cell), distance or position detection using infrared, acoustic, radio frequency or other methods, image sensing, etc.

A preferred embodiment of the invention normalizes the user analog input. For example, joystick movement can be calibrated so that the full extent of a vertical motion is determined and used to set upper and lower bounds for vertical position values. For example, analog input module 202 can receive user analog input (i.e., values) from a user analog control stick and then pass the values through a filter function to normalize the values. In a preferred embodiment, analog input module 202 is configured such that the receiving and normalization is conducted in real-time, as is known in the art.

If desired, analog input module 202 can also be configured to model and/or filter the values to, for example, compensate for poor quality of the user analog input. Furthermore, the analog user input can pass the values through a calibration routine. Other processing, calibration or conditioning of the input signals or values can be performed, as desired.

The preferred embodiment uses the display "base frame rate" (BFR) as a timing reference. The BFR is usually the rate at which frames are displayed to a user on a display device. For example, in video-based systems the BFR is near 30 frames per second (fps). It can be desirable to operate the analog input module at a BFR of the associated animation display system, as this will avoid potential problems with time-based controller aliasing causing unwanted artifacts elsewhere in the system or in the associated analog display system. Alternatively, an interpolator function running at the BFR, but separated from a base analog input module thread, can be used for receiving the analog user input.

Control state machine module 204 is configured to receive normalized user analog input from analog input module 202 and create a time-based state based on the received normalized analog input. Control state machine module 204 creates the time-based state such that it models the intent of the user with respect to an animated character being displayed by the animation display system.

In the golf game example a user may provide input related to (i) a neutral swing position of the animated golfer; (ii) a back swing of the animated golfer associated with a user pulling back an analog joystick; and (iii) a forward swing of the animated golfer associated with the user pushing the analog joystick forward. Since there is no physical concept of a forward swing without a back swing, the control state machine module can be configured, for example, to analyze a user's back and forward movements of the analog joystick over time to determine if they correspond to a complete swing, and if so, to pass a corresponding time-based state data to animation state machine 206. For instance, if the user pushes forward on the analog joystick without pulling back first, the control state machine module can disregard the normalized user analog input created from such a user's input. If, however, the user pulls all the way back on the analog joystick and then returns the analog stick to the neutral position, the control state machine module can consider that the user's intention is a test swing and will send the appropriate time-based state to the animation state machine module.

In the embodiment of FIG. 2, control state machine module 204 is configured to operate at the BFR of the associated animation display system and therefore updates the animation state (i.e., the time-based state) at the same frequency as the animation display system. Control state machine module 204 can also be configured such that "external factors" are incorporated in the time-based state. For instance, for an animated golfer in a video golf game, the choice of club may be handled automatically by the programmed game logic. When the user's ball is on the tee, then the game logic will automatically select a driver. However, when the user's ball is on the green, the game logic may select a putter. This is an example of an external input—the user will still be moving the stick back and forth to simulate a golf swing, but the Control state machine will ensure that the user's animated golfer either swings with a driver or putts correctly, depending on the circumstance.

Animation state machine module 206 is configured to receive the time-based state from the control state machine module, to create a list of animations and a blending percentage used for combing the list of animations based on the time-based state and to provide the list of animations and blending percentage to the analog display system for use in character animation.

For example, in the circumstance that system 200 is providing user input to an animated golfer, animation state machine module 206 can create, based on the time-based state, an animation list that includes a single back swing animation and a single forward swing animation each blended (i.e., combined) at 100%. Alternatively, animations state machine 206 can create an animation list that includes a plurality of animations, each with its own relative blending percentage. This is an advantage because the variety of user inputs far outweighs the ability to provide a unique animation for each one. By using a subset of animations representing the limits of the required animation range and a percentage blending factor between each range, an limited set of animations can cover the entire range of user input, For example, an animated golfer from a golf simulation video game, the animation state machine module may create a list of animations that includes a hook animation (A) and a slice animation (B) and a blending percentage (n). By blending those animations together using the equation:

$$A*n+B*(1-n)$$

where n is the blending percentage, the animation state machine module can provide for numerous variations between a hook and a slice in the character animation. If n is set to 0 then the user will hook the shot, if n is set to 1 then the user will slice and if n is set to 0.5, then the user will hit a straight shot. The ability to provide numerous variations (based on a list of animations and a blending percentage(s)) that model a user's intention in real-time provides a user with an exceptional level of control and feeling of feedback with respect to the character's animation.

In the embodiment of FIG. 2, animation state machine 206 is also configured to track the system's position in an animation cycle. Such tracking is beneficial since control state machine module 204 can cause non-linear time changes in the animation (e.g., when a user moves a joystick faster or slower to simulate different swing speeds of an animated golfer). Since, animation display system systems are time-based systems, where the next frame to be displayed is displayed n time units from the current one, the ability to move forward or backward during character animation requires that system 200 have the ability to track the current position in the animation so it can pass the correct time-period for the next frame. This non-linear aspect of system 200 allows system 200 to provide an extremely accurate modeling of user intent.

Figure 3:
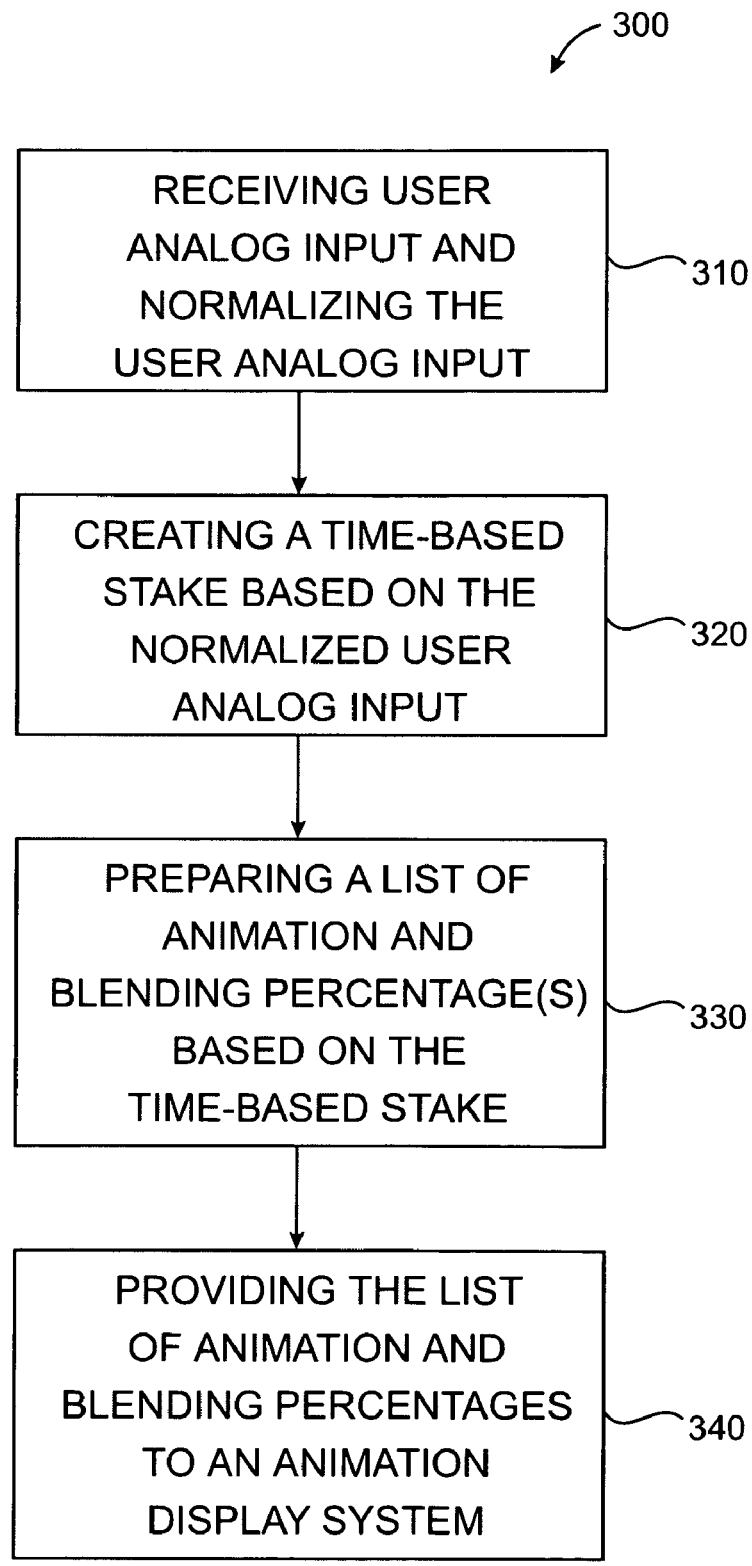
FIG. 3 is a flow diagram illustrating a sequence of steps in a process according to one exemplary embodiment of the present invention.

FIG. 3 is a flow chart, respectively, illustrating a sequence of steps in a process 300 according to one exemplary embodiment of the present invention providing user input for animated character display on an animation display system (e.g., a video game display system or a three-dimensional animation display system). The process includes first receiving user analog input related to animated character display and normalizing the user analog input, thereby creating normalized user analog input (see step 310 of FIG. 3). The user analog input can be received from, for example, an analog joystick and the receiving and normalization can proceed at a BFR of the animation display system.

Subsequently, a time-based state is created based on the normalized user analog input, as noted at step 320 of FIG. 3. This time-based state models an intent of the user with respect to the animated character. Referring top step 330, a list of animations and a blending percentage(s) for combining the list of animations based on the time-based state is then prepared. At step 340, the list of animations and blending percentage(s) are then provided to an animation display system for controlling character animation. The animation display system can employ a skeletal display system, bones, joints, and skeletal vertex mapping along with the list of animations and blending percentages when during character animation display.

Methods according to the present invention can be implemented, for example, on system 200 described above or other suitable systems. Furthermore, each of the receiving, creating, preparing and providing steps can be created at a BFR or a multiple of a BFR of the animation display system.

It should be understood that various alternatives to the embodiments of the invention described herein may be employed in practicing the invention. For example, although the invention has been discussed primarily with respect to a joystick user input device, any type of user input device can be used such as a keyboard or keypad, digitizing tablet, trackball, touch-screen, light pen, motion or position sensing, etc.

It is intended that the following claims define the scope of the invention and that structures and methods within the scope of these claims and their equivalents be covered thereby.

What is claimed is:

1. A system for providing user input for animated character display on an animation display system comprising:
   an analog input module configured to receive user analog input related to animated character display and to normalize the user analog input, thereby creating normalized user analog input;
   a control state machine module configured to receive normalized user analog input from the analog input module and create a time-based state based on the received normalized analog input, the time-based state modeling an intent of the user with respect to the animated character; and
   an animation state machine module configured to receive the time-based state from the control state machine module and to create a list of animations and at least one blending percentage for combining the list of animations based on the time-based state, and providing the list of animations and at least one blending percentage to the animation display system.

2. The system of claim 1, wherein the analog input module is operated at a multiple of a base frame rate of the analog display system.

3. The system of claim 1, wherein the analog input module is further configured to model the received user analog input.

4. The system of claim 1, wherein the analog input module is further configured to filter the received user analog input.

5. The system of claim 1, wherein the control state machine is further configured to operate at a multiple of a base frame rate of the analog display system.

6. The system of claim 1, wherein the animated state machine module is also configured to track a current position of the system in an animation cycle.

7. A method for providing user input for animated character display on an animation display system comprising:
   receiving user analog input related to animated character display and normalizing the user analog input, thereby creating normalized user analog input;
   creating a time-based state based on the normalized analog input, the time-based state modeling an intent of the user with respect to the animated character;
   preparing a list of animations and at least one blending percentage for combining the list of animations based on the time-based state, and
   providing the list of animations and at least one blending percentage to an animation display system for controlling character animation.

8. The method of claim 7, wherein the receiving, creating, preparing and providing steps are conducted at a base frame rate of the animation display system.

* * * * *